United States Patent
Kielbowicz et al.

(10) Patent No.: US 11,525,483 B2
(45) Date of Patent: Dec. 13, 2022

(54) SELF-CENTERING FLEXIBLE COUPLING

(71) Applicant: Hamilton Sundstrand Corporation, Charlotte, NC (US)

(72) Inventors: Dariusz Kielbowicz, Boleslawiec (PL); Marcin Cis, Lutynia (PL)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 520 days.

(21) Appl. No.: 16/217,080

(22) Filed: Dec. 12, 2018

(65) Prior Publication Data

US 2019/0271360 A1    Sep. 5, 2019

(30) Foreign Application Priority Data

Mar. 5, 2018 (EP) ..................................... 18461527

(51) Int. Cl.
*F16D 3/18* (2006.01)
*F16D 3/06* (2006.01)

(52) U.S. Cl.
CPC ............... *F16D 3/185* (2013.01); *F16D 3/06* (2013.01); *Y10T 403/7032* (2015.01)

(58) Field of Classification Search
CPC ... F16D 1/06; F16D 3/06; F16D 3/185; F16D 3/52; F16D 3/72; F16D 2001/103; F16D 2003/2232; Y10T 403/7026; Y10T 403/7028; Y10T 403/7031; Y10T 403/7032; Y10T 403/7033; Y10T 403/7035
USPC ........... 403/359.1–359.6; 464/158, 159, 162, 464/169
See application file for complete search history.

(56) References Cited

U.S. PATENT DOCUMENTS

| | | | | |
|---|---|---|---|---|
| 2,104,669 A | * | 1/1938 | Peterson | F16D 3/185 464/158 |
| 2,769,323 A | * | 11/1956 | O'Malley | F16D 3/185 464/156 |
| 2,914,929 A | * | 12/1959 | Irons | F16D 41/22 464/158 |

(Continued)

FOREIGN PATENT DOCUMENTS

| | | | | |
|---|---|---|---|---|
| DE | 1155747 B | * | 10/1963 | ............. F16D 3/185 |
| DE | 1155747 B | | 10/1963 | |

(Continued)

OTHER PUBLICATIONS

European Search Report for Application No. 18461527.6-1015, dated Jan. 29, 2019, 7 pages.

*Primary Examiner* — Josh Skroupa
(74) *Attorney, Agent, or Firm* — Cantor Colburn LLP (57) ABSTRACT

A coupling for allowing torque transmission between a first and second shaft, the coupling comprising: a cup-shaped portion provided at a first end of said first shaft and a first end of said second shaft being positioned within said cup-shaped portion; and said coupling further comprising a biasing means positioned between said first and second shafts, such that said biasing means is in contact with both of said first and second shafts. A shaft system can include the first coupling in combination with a third shaft and a second coupling that is provided between the third shaft and either a second end of said first shaft or a second end of said second shaft. The second coupling is identical to the first coupling.

10 Claims, 4 Drawing Sheets

(56) References Cited

U.S. PATENT DOCUMENTS

| | | | | |
|---|---|---|---|---|
| 3,578,363 | A * | 5/1971 | De Rocker | F16D 3/185 403/355 |
| 3,999,404 | A * | 12/1976 | Banki | F16D 3/185 464/32 |
| 4,037,430 | A * | 7/1977 | Wright | F16D 3/185 464/158 |
| 4,112,710 | A * | 9/1978 | Okuda | F16D 3/06 403/166 |
| 4,136,532 | A * | 1/1979 | Okuda | F16D 3/06 464/113 |
| 4,900,177 | A * | 2/1990 | Ferguson | F16D 1/06 403/359.4 |
| 4,989,712 | A * | 2/1991 | Janiszewski | F16D 3/06 192/55.2 |
| 5,911,630 | A * | 6/1999 | Shigeura | F16D 3/185 464/158 |
| 6,283,869 | B1 * | 9/2001 | Spensberger | F16D 3/185 464/153 |
| 6,306,042 | B1 * | 10/2001 | Tortul | F01L 1/34406 464/158 |
| 6,547,613 | B1 | 4/2003 | Onoue et al. | |
| 9,206,859 | B2 | 12/2015 | Descubes et al. | |
| 9,688,394 | B2 | 6/2017 | Christensen et al. | |
| 9,879,731 | B2 * | 1/2018 | Yamamoto | F16D 3/185 |
| 9,976,602 | B2 * | 5/2018 | Parmeter | F16D 3/185 |
| 10,016,798 | B2 * | 7/2018 | Yamamoto | F16D 3/185 |
| 10,408,275 | B2 * | 9/2019 | Neugebauer | F16D 3/185 |
| 2011/0278778 | A1 | 11/2011 | Qattan | |
| 2017/0276182 | A1 * | 9/2017 | Davies | F16D 3/185 |

FOREIGN PATENT DOCUMENTS

| | | | | |
|---|---|---|---|---|
| DE | 3303929 | C1 * | 7/1984 | F16D 3/185 |
| DE | 102015007711 | A1 * | 12/2016 | F16D 3/185 |
| EP | 3222868 | A1 | 9/2017 | |
| FR | 914232 | A | 10/1946 | |
| FR | 2444194 | A1 | 7/1980 | |
| GB | 2180625 | A * | 4/1987 | F16D 3/185 |
| SU | 1103915 | A1 * | 7/1984 | F16D 3/185 |
| WO | WO-8907494 | A1 * | 8/1989 | F16D 3/185 |

* cited by examiner

Fig. 1

PRIOR ART

SELF-CENTERING FLEXIBLE COUPLING

FOREIGN PRIORITY

This application claims priority to European Patent Application No. 18461527.6 filed Mar. 5, 2018, the entire contents of which is incorporated herein by reference.

TECHNICAL FIELD

The present disclosure relates to a coupling and a method of reducing wear from axial movement and/or angular misalignment between two movable parts. The coupling may be considered to be a self-centering flexible coupling.

BACKGROUND

Many vehicles utilise one or more shafts to couple movable/rotatable parts. For example, to couple an engine with an actuator, or a motor with vehicle wheels, as well as other combinations. In many applications, misalignment may occur between the shafts, particularly in different operating regimes (e.g. during high-speed operation versus idling operation, or at low-temperature operation versus high temperature operation). Misalignment can result from flexing or thermal expansion/contraction of the frame to which two movable parts are attached. It is desirable to accommodate misalignment between the shafts so as to avoid damaging stress concentrations and reduce fatigue.

SUMMARY

According to a first aspect, the disclosure describes a coupling allowing torque transmission between a first and second shaft. The coupling may be described as being a flexible coupling and comprises a cup-shaped portion provided at a first end of the first shaft and a first end of the second shaft is positioned within the cup-shaped portion. This thereby acts to couple the first and second shafts together. The coupling further comprises a biasing means positioned between the first and second shafts, such that the biasing means is in contact with both of the first and second shafts. This therefore provides a biasing force on both of the first and second shafts.

In some examples described herein, at least one of the first and second shafts may comprise an internal cavity, and the biasing means may be provided within the cavity.

In any of the examples described herein, the biasing means may be a spring.

In some examples described herein, the first shaft may extend longitudinally along a first shaft axis; and the second shaft may extend longitudinally along a second shaft axis; wherein the first shaft axis is coaxial with the second shaft axis in an equilibrium position; and the biasing means may be arranged so as to compress in response to angular misalignment away from the equilibrium position between the first and second shaft axes and/or to compress in response to relative axial movement of the first and second shafts towards each other away from the equilibrium position.

In some examples described herein, an internal surface of the cup-shaped portion may comprise inwardly extending radial splines and an external surface of the portion of the second shaft that is positioned within the cup-shaped portion may comprise radially extending splines; and the first shaft may extend longitudinally along a first shaft axis and the second shaft may extend longitudinally along a second shaft axis; and the splines may be configured to allow relative axial movement of between the two shafts; and/or the splines may be configured to allow relative axial misalignment between the axes of the two shafts.

In some examples described herein, the splines on the first shaft may be arranged around an inner circumference of the cup-shaped portion and the splines of the second shaft may extend radially outward from the portion of the second shaft that is positioned within the cup-shaped portion.

In some examples described herein, the biasing means is physically connected to one or both of the first and second shafts.

In some examples described herein, the biasing means is at least partially located in a cavity of the second shaft and/or the biasing means is at least partially located in a cavity of the first shaft.

In some examples described herein, the biasing means is a spring and the spring constant of the spring is selected such that, in use, the spring will return the shafts to an equilibrium position when the torque being transmitted across the shafts is below a predetermined value.

In some examples described herein, the shafts may be arranged such that there is a preload in the biasing means at the equilibrium position, or the shafts may be arranged such that there is no preload in the biasing means at the equilibrium position.

A shaft system is also described herein comprising this first coupling, a third shaft; and a second coupling that is provided between the third shaft and either a second end of the first shaft (the second end being opposite to the first end longitudinally) or a second end of the second shaft (the second end being opposite to the first end longitudinally), wherein the second coupling is identical to the first coupling in that it comprises an end of one of the shafts received in a cup-shaped portion of the other shaft, with the biasing member provided there between.

A method of coupling a first and a second shaft together for torque transmission is also described herein. The method comprises providing the first shaft having a first end with a cup-shaped portion, and positioning a portion of a first end of the second shaft within the cup-shaped portion of the first shaft. This therefore couples the first and second shafts together. The method further comprises providing a biasing means between the first and second shafts so that the biasing means contacts both of the first and second shafts.

In some examples described herein, the method may further comprise providing the biasing means in an internal cavity of either, or both, of the first or second shaft.

In some examples described herein, an internal surface of the cup-shaped portion may comprise inwardly extending radial splines and an external surface of the portion of the second shaft this is received in the cup-portion may comprise radially extending splines. The first shaft may also extend longitudinally along a first shaft axis and the second shaft may extend longitudinally along a second shaft axis. The method may further comprise configuring the splines to allow relative axial movement of between the two shafts, and/or to allow relative axial misalignment between axes of the two shafts.

In some examples described herein, the method may further comprise physically connecting the biasing means to one or both of the first and second shafts.

In some examples described herein, the method may comprise selecting a spring constant of the spring such that, in use, the spring will return the shafts to an equilibrium position when the torque being transmitted across the shafts is below a predetermined value.

In some examples described herein, the method may further comprise arranging the spring and shafts such that there is a preload in the spring in an equilibrium position of the two shafts, or arranging the spring and shafts such that there is no preload in the spring at the equilibrium position of the two shafts.

In some examples, the method may comprise coupling a third shaft to either a second end of the first shaft or a second end of the second shaft; wherein the second end of the first or second shaft comprises a cup-shaped portion, and a first end of the third shaft is received in the cup-shaped portion, or wherein the first end of the third shaft comprises a cup-shaped portion and the second end of the first or second shaft is received in the cup-shaped portion, and further comprising providing a second biasing means between the third shaft and the second end of the first or second shaft, the second biasing means contacting both the third shaft and the first or second shaft.

In some examples described herein, the method may further comprise locating a first end of a third shaft adjacent a second end of the first shaft opposite to the first end, wherein one of the second end of the second shaft or the first end of the third shaft comprises a cup-shaped portion, and the other of the second end of the second shaft and the first end of the third shaft comprises a connection portion for being received in the cup-shaped portion. The method may further comprise arranging the second and third shafts such that the connection portion is positioned within the cup-shaped portion. The method may further comprise providing an internal cavity at the second end of the second shaft or the first end of the third shaft with a second spring being located in the cavity wherein the second spring contacts a surface of both of the second and third shafts.

DESCRIPTION OF THE FIGURES

Certain embodiments of the present disclosure will now be described in greater detail by way of example only and with reference to the accompanying drawings in which.

DETAILED DESCRIPTION

Figure 1:
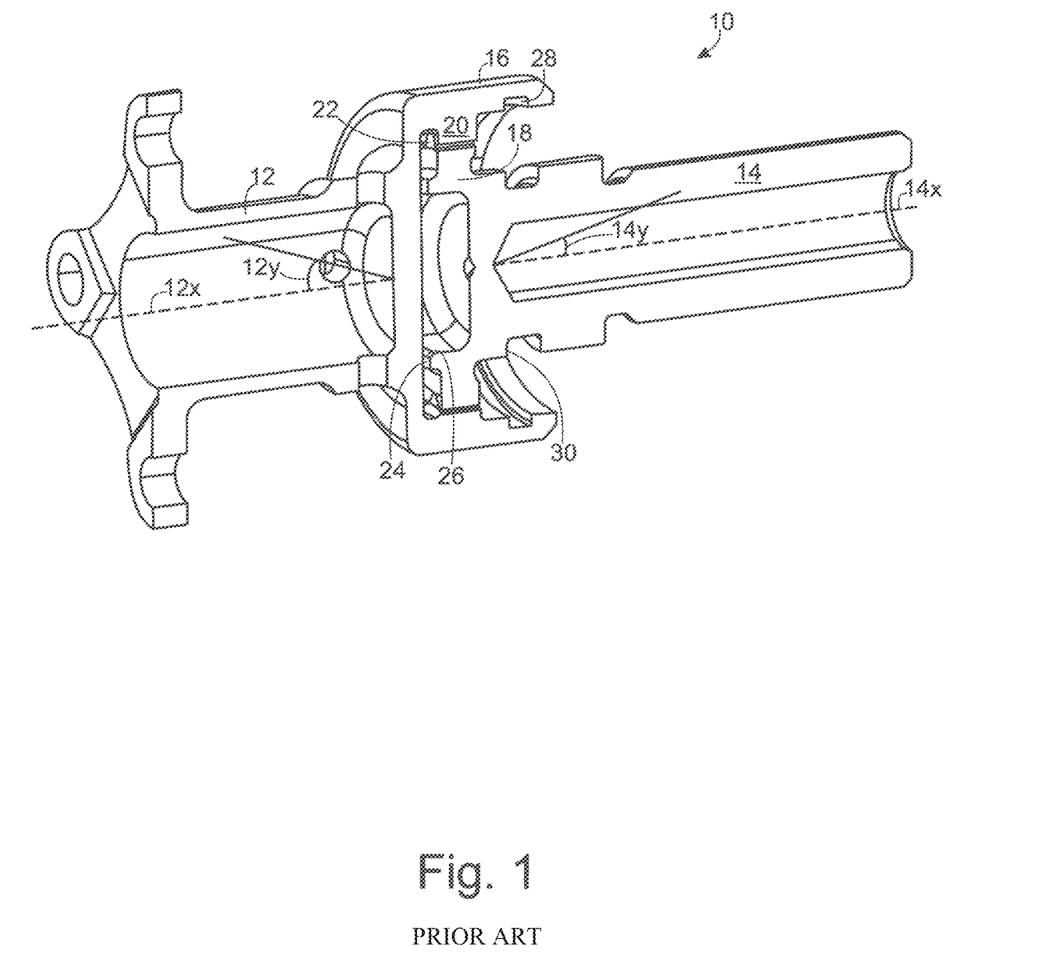
FIG. 1 shows a perspective view of a known flexible coupling for accommodating axial and angular misalignment between two shafts.
Figure 2:
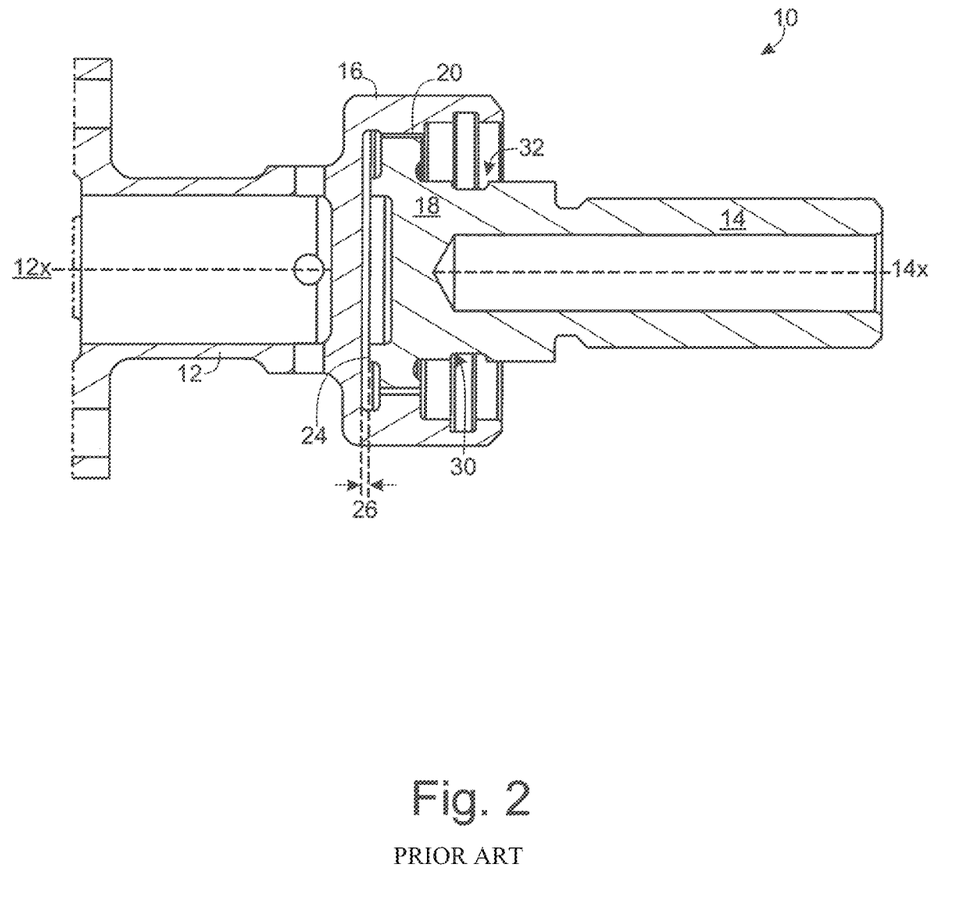
FIG. 2 shows a cross-sectional view of the known coupling of FIG. 1.

FIGS. 1 and 2 show a known shaft coupling 10. In detail, one end of a first shaft 12 has a generally cup-shaped portion 16 having a plurality of inward facing splines 20, this cup-shaped portion 16 being sized and shaped so as to be able to receive an end of a second shaft 14. The first shaft 12 extends along a major longitudinal axis 12x. The end of the second shaft 14 that is received in the cup-shaped section 16 of the first shaft 12 has a connection portion 18 comprising a plurality of outward facing splines 22 that are shaped, sized and configured so as to mesh with the inward facing splines 20 of the first shaft 12. These splines 20, 22 allow torque to be transmitted between the first 12 and second 14 shafts in use. The second shaft 14 extends along the major longitudinal axis 14x. The two axes 12x, 14x are normally coaxial; however, a degree of angular misalignment can occur between these two axes during use of the flexible coupling 10.

Each of the two shafts 12, 14 has generally cylindrical symmetry both inwardly and outwardly, so that it may be said that: the inward facing splines 20 are radially inwardly facing splines, the outward facing splines 22 are radially outward facing splines, the two sets of splines 20,22 abutting at respective generally circumferential faces.

The first 12 and second 14 shafts may be connected to respective parts of a vehicle. For example, the first shaft 12 may be coupled to a motor or engine (not shown) and the second shaft 14 may be connected to an actuator (not shown) or other movable part. Alternatively, the second shaft 14 may connect to a further shaft (not shown). The motor and movable part may move slightly relative to each other due to, for example, flexing or thermal expansion/contraction of a vehicle frame to which both are attached.

To accommodate this movement, there is a gap 26 provided between the end of the second shaft 14 that is received in the cup-shaped portion 16 of the first shaft 12. In the example shown in FIG. 1, gap 26 exists between the base of the cup-shaped portion 16 and the end of the shaft 14 that is received within the cup-shaped portion 16.

In use, the first shaft 12 may move along the longitudinal axes 12x, 14x and therefore relatively towards or away from the second shaft 14, thus changing the size of the gap 26. The splines 20, 22 can slide axially past one another to accommodate this relative movement of the shafts 12, 14. In the example of FIG. 1, the second shaft 14 is also provided with a lip 24 that provides a hard stop to abut against the first shaft 12. This lip 24 limits this axial movement when the shafts 12, 14, are moving towards one another.

To prevent the shafts 12, 14 from decoupling when moving axially apart from one another, a circlip/Seeger ring (not shown) may be provided in a channel 28 that extends around the inner perimeter of the cup-shaped portion 16. The circlip can hold an axial translation stop in place that engages with a channel 30 on the second shaft 14 to prevent decoupling of the shafts 12, 14. Alternatively or additionally, the cup-shaped portion 16 may be closed with a lid (not shown) attached to the open end of the cup-shaped portion 16. The lid may have a hole therethrough, through which the second shaft 14 extends.

The splines 20, 22 may also be configured to accommodate some angular misalignment between the shafts 12, 14. That is, the longitudinal axis 12x,14x of one of the first 12 or second shafts 14 may pivot relative to the other shaft's longitudinal axis so as to be angularly displaced by an angle 12y, 14y. In one example, the splines 20, 22 may be configured to allow up to ±5 degrees of angular misalignment, optionally up to ±1 degree.

One or both of the shafts 12, 14 may be generally hollow. This can reduce the weight of the flexible coupling 10.

Figure 3:
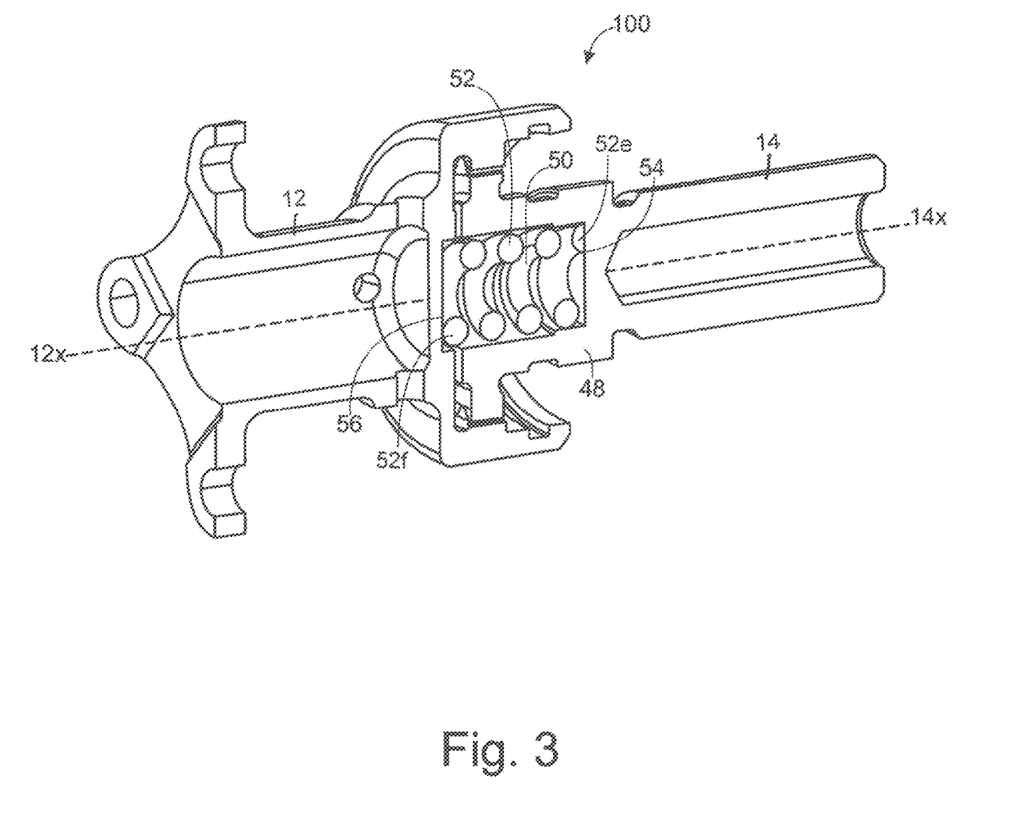
FIG. 3 shows a perspective view of a flexible coupling according to the present disclosure.

FIG. 3 shows a new type of flexible coupling 100 according to the present disclosure. Some features of this flexible coupling 100 are substantially identical to the flexible coupling 10 of FIGS. 1 and 2 and, where parts are identical, like reference numerals are used.

As before, a first shaft 12 is connected to a second shaft 14 via a coupling means. Interlocking splines 20, 22 allow torque to be transmitted between the two shafts 12, 14.

Figure 4:
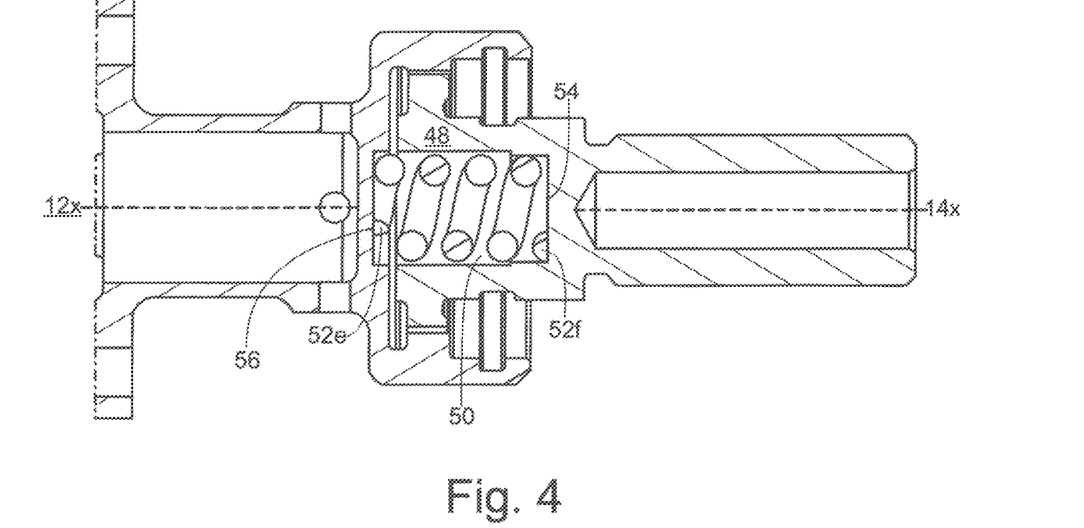
FIG. 4 shows a cross-sectional view of the coupling of FIG. 3.

The new type of flexible coupling 100 shown in FIGS. 3 and 4, however, has a modified connection portion 48 compared to the connection portion 18 of the known flexible coupling 10 depicted in FIGS. 1 and 2.

A portion 48 (which may be referred to, perhaps as a connection portion 48) of the new type of coupling comprises a cavity 50 that is located internally of the second shaft 14 and generally radially inward from the splines 22. Although the cavity 50 is shown in the Figures as only being present in one of the shafts, the cavity 50 may extend at least partially in either, or both of the shafts that are being coupled together.

The cavity 50 may be generally cylindrical and may also extend longitudinally along the same axis as the axis 14x of the second shaft 14. The cavity further contains a biasing means 52. In this example, the biasing means comprises a spring 52. The spring 52 shown in FIGS. 3 and 4 is a coil spring that extends helically about the second shaft axis 14x and within the cavity 50. Other biasing means may also be used and the skilled person will also recognize that other forms of spring 52 may be used without departing from the scope of the present disclosure, including but not limited to: wave springs, pneumatic springs, Belleville springs, volute springs, and rubber inserts.

As shown in FIG. 4, the biasing means or spring 52 is sized and shaped so that a first end 52e of the biasing means or spring 52 abuts the inner surface of the cup-shaped portion 16 at one end of the cavity 50 and also abuts a surface, or portion 54 of the second shaft 14 as shown in FIG. 3.

The spring 52 extends from this first end 52e, and through the hollow cavity 50 so that the opposite, second end 52f of the spring 52 abuts a portion 56 of the first shaft 12.

The spring 52 thus extends from the portion 54 of the second shaft 14, through the cavity 50, across the gap 26, and to the portion 56 of the first shaft 12.

In some examples, the first end 52e of the spring 52 may be connected to the second shaft portion 54, e.g. by glue, by welding, or by interlocking with the second portion 54. Alternatively, the first end 52e of the spring 52 may simply abut the second portion 54 without any physical or mechanical attachment.

In some examples, the second end 52f of the spring 52 may be connected to the first shaft portion 56, e.g. by glue, by welding, or by interlocking with the portion 56. Alternatively, the second end 52f of the spring 52 may simply abut the portion 56 without any physical or mechanical attachment.

When the first and second shafts 12, 14 move axially towards each other, the biasing means or spring 52 is therefore compressed, which in turn causes a biasing force resisting further movement of the shafts 12, 14 towards each other axially and encouraging the shafts 12, 14 back to an equilibrium position.

When there is angular misalignment between the two shafts 12, 14, the spring 52 is also compressed. For example, if the spring 52 is a helical spring having flat-circular ends, then an axially-directed force applied at any circumferential location on the flat-circular ends will cause some bending of the spring 52. The spring 52 thus provides a biasing force encouraging the first and second shafts 12, 14 to return to an equilibrium position where their axes 12x, 14x are coaxial and the shafts 12, 14 are centered.

As a result of the presence of this biasing means or spring 52, the coupling 100 (which is described herein as being flexible in that it allows for the relative movement of both shafts that are coupled together) may therefore be considered to be a self-centering flexible coupling. That is, the spring 52 causes the flexible coupling 100 to automatically return itself to a position where the shafts 12, 14 are coaxial and at a predetermined relative axial position (i.e. with a predetermined gap 26).

If the spring 52 is physically connected to the two shafts 12, 14 then it may provide a tension force when the shafts 12, 14 move axially apart, so as to return the shafts to the equilibrium position.

If the spring is not physically connected to the two shafts 12, 14 then it may readily be replaced during maintenance of the flexible coupling, e.g. in the event of metal fatigue.

In an alternative configuration (not shown), a cavity may be provided in the first shaft 12 for receiving the spring 52, rather than in the cavity 50 in the second shaft 14. The spring 52 contained in a cavity in the first shaft 12 may then extend across this cavity and across a gap to abut the second shaft 14. That is, it is a matter of design choice whether the spring 52 is mainly housed in the first shaft 12, or the second shaft 14, or partially housed in cavities formed in both shafts 12,14. Aside from the internal configuration of the shafts 12, 14, this alternative embodiment may function identically to the example described above with reference to FIGS. 1-4.

Figure 5:
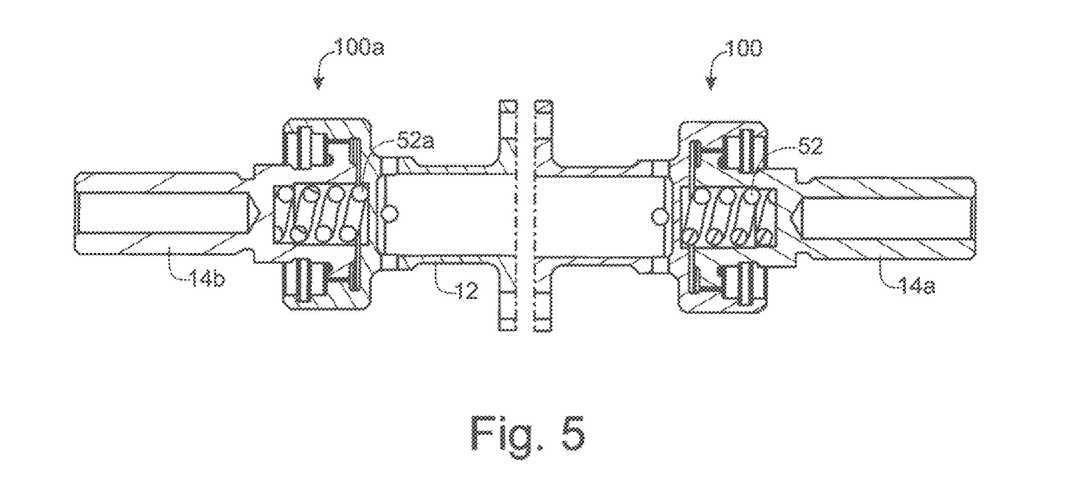
FIG. 5 shows a cross-sectional view of a pair of flexible couplings according to the present disclosure.

FIG. 5 shows a shaft system comprising a pair of flexible couplings 100,100a used in combination according to the present disclosure and FIGS. 3 and 4. In this arrangement there is a first shaft 12 that connects to a second shaft 14a via a first flexible coupling 100, as in the manner shown in FIGS. 3 and 4. The first shaft 12, however, also connects at its opposite end to a third shaft 14b via a second flexible coupling 100a.

In the example shown, the second 14a and third 14b shafts are generally identical to the second shaft 14 as described above in relation to FIGS. 3-4. The first shaft 12 is generally also identical to the first shaft 12 as described above in relation to FIGS. 3-4, except that (unlike FIGS. 3-4) the first shaft 12 has cup-shaped portions 16 at both ends. Each cup-shaped portion 16 may be suitable for forming a flexible coupling 100 according to the present disclosure in the same way as described with reference to FIGS. 3 and 4.

Alternatively, (not shown) the shafts may have a connection portion 48 at one end, and a cup-shaped portion 16 at the other end.

In the orientation shown in FIG. 5, the first shaft 12 can move axially left and right between the second 14a and third shafts 14b. In this example, when the first shaft 12 moves away from the third shaft 14b it is therefore moving towards the second shaft 14a. Thus, the spring 52 in the first flexible coupling 100 will be compressed and will urge the first shaft 12 back towards the third shaft 14b, until an equilibrium position is reached.

Continuing with the above example, if the spring 52a is physically connected to its respective shafts then this spring 52a will be tensioned by the movement of the first shaft 12 away from the third shaft 14b. Consequently, this spring 52a will also contribute to returning the shafts 12, 14a, 14b to their equilibrium position.

Similarly, if there is angular misalignment between any pair of adjacent shafts depicted in FIG. 5, one or both of the springs 52, 52a will be compressed and thus urge that pair of shafts back to an equilibrium position in which the shaft axes are coaxial.

In the arrangement of FIG. 5, at the equilibrium position, the springs 52, 52a, may be at their natural length (i.e. they are not in compression or in extension). Alternatively, there may be a preload in the springs 52, 52a.

The presence of the third shaft 14b may prevent the first shaft 12 from moving too far axially away from the second shaft 14a (e.g. prevents the decoupling of the first 12 and second shafts 14 of the first flexible coupling 100).

By way of example only, in the arrangement shown in FIG. 5, the second shaft 14a may connect to a motor or engine that is mounted to a vehicle frame, and the third shaft 14b may connect to a movable part (e.g. a rotary actuator) that is also attached to the vehicle frame. The first shaft 12 may float freely between the other two shafts such that the first shaft 12 is only connected to the frame by the flexible connectors 100a, 100. That is, for the first shaft 12, the flexible couplings 100a, 100 are the only points of attachment to the vehicle frame. This allows the first shaft 12 to move freely to accommodate axial and angular misalignment between the second 14 and third 14b shafts, within the bounds allowed by the pair of flexible couplings 100a, 100.

In a flexible coupling 100 according to the present disclosure, the spring constant of the spring 52 may be chosen to be large enough such that, when no torque is being transmitted across the shafts 12, 14 the spring 52 will move the shafts 12, 14 to a neutral position in which the shaft axes 12x, 14x are aligned and the gap 26 is of a predetermined length. Further, the spring constant may be chosen to be small enough such that the spring 52 does not significantly affect the shafts' positions when torque is being transmitted. This can reduce wear of the parts to which the shafts 12, 14 connect (e.g. the motor and the moving part).

The invention claimed is:

1. A shaft system for torque transmission, the shaft system comprising:
    a first shaft;
    a second shaft;
    a third shaft; and
    a first coupling comprising:
        a cup-shaped portion formed integral with a first end of said first shaft;
        a first end of said second shaft being positioned within said cup-shaped portion; and
        a biasing means positioned between said first and second shafts, such that said biasing means is in contact with both of said first and second shafts;
    wherein:
    said first shaft extends longitudinally along a first shaft axis;
    said second shaft extends longitudinally along a second shaft axis;
    the first shaft axis is coaxial with the second shaft axis in an equilibrium position; and
    said biasing means is arranged so as to compress in response to angular misalignment away from the equilibrium position between the first and second shaft axes and to compress in response to relative axial movement of the first and second shafts towards each other away from the equilibrium position;
    the shaft system further comprising:
    a second coupling being provided between said third shaft and a second end of said first shaft (12),
    wherein said second coupling is identical to the first coupling;
    wherein the biasing means of the second coupling is located in an internal cavity of a given one of the first shaft and third shaft, wherein the given one of the first and third shafts does not have the cup-shaped portion;
    wherein the second shaft is connected to a frame,
    wherein the third shaft is connected to a movable part that is connected to the frame,
    wherein the first shaft floats freely between the second and third shafts such that the first shaft is only connected to the frame via the first and second couplings.

2. The shaft system of claim 1, wherein at least one of said first and second shafts comprises an internal cavity, and wherein said biasing means is provided within said cavity.

3. The shaft system of claim 1, wherein said biasing means is a spring.

4. The shaft system according to claim 1, wherein an internal surface of said cup-shaped portion comprises inwardly extending radial splines and an external surface of said portion of said second shaft that is positioned within said cup-shaped portion comprises radially extending splines;
    wherein said first shaft extends longitudinally along a first shaft axis and said second shaft extends longitudinally along a second shaft axis; and
    wherein the splines are configured to allow relative axial movement of between the two shafts; and/or wherein the splines are configured to allow relative axial misalignment between the axes of the two shafts.

5. The shaft system according to claim 4, wherein the splines on the first shaft are arranged around an inner circumference of said cup-shaped portion and wherein the splines of the second shaft extend radially outward from the portion of said second shaft that is positioned within said cup-shaped portion.

6. The shaft system according to claim 1, wherein the biasing means is physically connected to one or both of the first and second shafts.

7. The shaft system according to claim 1, wherein the biasing means is at least partially located in a cavity of the second shaft and/or wherein the biasing means is at least partially located in a cavity of the first shaft.

8. The shaft system according to claim 1, wherein the biasing means is a spring and wherein the spring constant of the spring is selected such that, in use, the spring will return the shafts to an equilibrium position when the torque being transmitted across the shafts is below a predetermined value.

9. The shaft system according to claim 1, wherein the shafts are arranged such that there is a preload in the biasing means at the equilibrium position, or wherein the shafts are arranged such that there is no preload in the biasing means at the equilibrium position.

10. A method of coupling a first shaft, a second shaft and a third shaft together for torque transmission, the method comprising:
    providing said first shaft having a first end with a cup-shaped portion integrally formed with the first shaft, and positioning a portion of a first end of said second shaft within said cup-shaped portion of said first shaft; and
    providing a first biasing means between said first and second shafts so that said biasing means contacts both of said first and second shafts;
    wherein:
    said first shaft extends longitudinally along a first shaft axis;
    said second shaft extends longitudinally along a second shaft axis;
    the first shaft axis is coaxial with the second shaft axis in an equilibrium position; and
    said first biasing means is arranged so as to compress in response to angular misalignment away from the equilibrium position between the first and second shaft axes and to compress in response to relative axial movement of the first and second shafts towards each other away from the equilibrium position, the method further comprising:

coupling a second end of the first shaft to the third shaft;

providing a second biasing means between said first and third shafts so that said second biasing means contacts both of said first and third shafts;

wherein the second biasing means are located in an internal cavity of a given one of the first shaft and third shaft, wherein the given one of the first and third shafts does not have the cup-shaped portion;

wherein the second shaft is connected to a frame, wherein the third shaft is connected to a movable part that is connected to the frame, wherein the first shaft floats freely between the second and third shafts such that the first shaft is only connected to the frame via the first and second couplings.

* * * * *